US012772302B2

(12) United States Patent
Gundavelli et al.

(10) Patent No.: US 12,772,302 B2
(45) Date of Patent: Oct. 20, 2026

(54) NETWORK SLICE UTILIZATION MANAGEMENT IN WIRELESS NETWORKS

(71) Applicant: Cisco Technology, Inc., San Jose, CA (US)

(72) Inventors: Sri Gundavelli, San Jose, CA (US); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 18/343,908

(22) Filed: Jun. 29, 2023

(65) Prior Publication Data

US 2025/0008575 A1 Jan. 2, 2025

(51) Int. Cl.
*H04W 4/00* (2018.01)
*H04W 40/02* (2009.01)
*H04W 76/10* (2018.01)

(52) U.S. Cl.
CPC ........... *H04W 76/10* (2018.02); *H04W 40/02* (2013.01)

(58) Field of Classification Search
CPC ...... H04W 76/10; H04W 40/02; H04W 76/12
See application file for complete search history.

(56) References Cited

U.S. PATENT DOCUMENTS

| | | | | |
|---|---|---|---|---|
| 2020/0154515 | A1 | 5/2020 | Ni et al. | |
| 2021/0068044 | A1 * | 3/2021 | Chan | H04W 48/18 |
| 2021/0120596 | A1 | 4/2021 | Youn et al. | |
| 2021/0176819 | A1 | 6/2021 | Yang et al. | |
| 2021/0250852 | A1 | 8/2021 | Huang et al. | |
| 2022/0264540 | A1 * | 8/2022 | Panchal | H04W 72/04 |
| 2022/0272652 | A1 | 8/2022 | Song et al. | |
| 2022/0386226 | A1 * | 12/2022 | Chen | H04L 41/5051 |

* cited by examiner

*Primary Examiner* — Omoniyi Obayanju
(74) *Attorney, Agent, or Firm* — Polsinelli P.C.

(57) ABSTRACT

Systems, methods, and computer-readable media are provided for optimizing utilization of available network slices, where such slices are created for specific applications/purposes. In one aspect, a method includes establishing a Protocol Data Unit (PDU) session for a mobile device on a default network slice; determining an application to be used on the mobile device; determining a specific network slice for servicing the application used on the mobile device; and configuring the mobile device to use the application on the specific network slice.

20 Claims, 8 Drawing Sheets

NETWORK SLICE UTILIZATION MANAGEMENT IN WIRELESS NETWORKS

TECHNICAL FIELD

The present disclosure relates to communication systems, and in particular, to solutions for optimizing utilization of network slices by connected devices.

BACKGROUND

Cellular network technologies including 4G, 5G, etc., offer access to a broad range of spectrum resources. As such, efficient use of all spectrum bands and resources is key to delivering a broad range of services with optimal Quality of Service and QoE (Quality of Experience). 5G services are in demand with business verticals and service providers.

Network registration procedures defined in the 3rd Generation Partnership Program (3GPP) standards for cellular communications often introduce redundancies in terms of signaling and payload, that should be addressed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
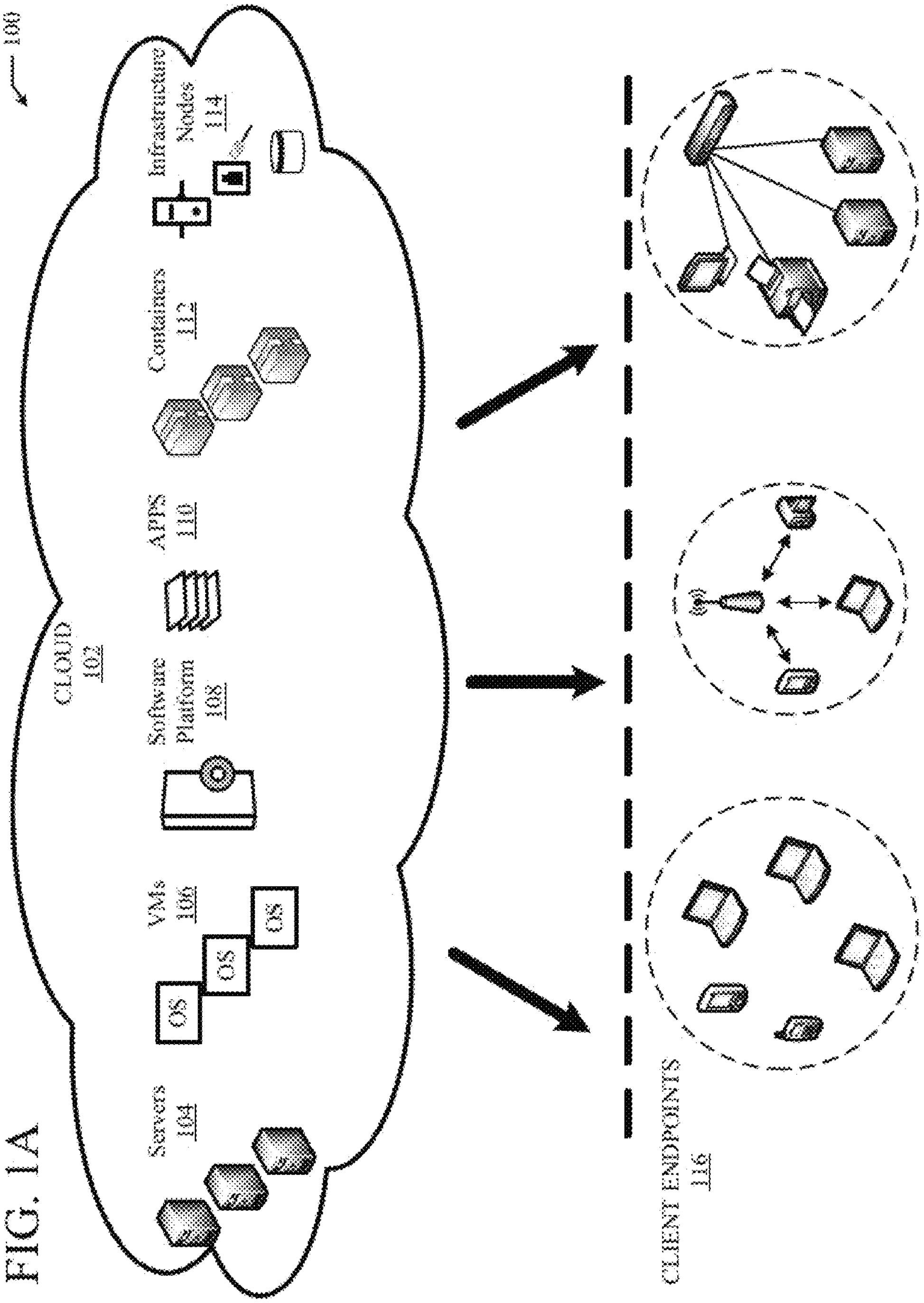
FIG. 1A illustrates an example cloud computing architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are provided for optimizing utilization of available network slices, where such slices are created for specific applications/purposes. As will be described below, each connected end device may perform initial authentication and network attachment via a Packet Data Unit (PDU) session with a default network slice. Upon attachment to the network, and depending on specific application(s) being used, at any given time, on the connected end device, said connected end device may be registered with a specific network slice servicing the application(s) in use. Such connection may then be taken down upon termination of the application(s) on the connected end device. In this manner, network slice utilization is optimized.

In one aspect, a method includes establishing a Protocol Data Unit (PDU) session for a mobile device on a default network slice; determining an application to be used on the mobile device; determining a specific network slice for servicing the application used on the mobile device; and configuring the mobile device to use the application on the specific network slice.

In another aspect, determining the application to be used on the mobile device includes receiving Generic Slice Templates (GST) requirements for the specific network slice from the mobile device; determining the specific network slice based on the GST requirements.

In another aspect, the GST requirements are received as part of Domain Name Service (DNS) resolution on the default network slice.

In another aspect, the method further includes receiving User Route Selection Policy (URSP) as part of the DNS resolution on the default network slice.

In another aspect, configuring the mobile device includes performing slice authorization for the specific network slice on the default network slice; configuring User Route Selection Policy (URSP) for using the specific network slice application, on the mobile device; and establishing a new PDU session for the mobile device on the specific network slice using the URSP.

In another aspect, the method further includes detecting a termination of use of the application on the mobile device; and terminating a communication session on the specific network slice for the mobile device upon detecting the termination of use of the application on the mobile device.

In another aspect, the PDU session over the default network slice and a new PDU session on the specific network slice are established with a UPF of a 5G core network.

In one aspect, an apparatus includes one or more memories having computer-readable instructions stored therein; and one or more processors. The one or more processors are configured to execute the computer-readable instructions to establish a Protocol Data Unit (PDU) session for a mobile device on a default network slice; determine an application to be used on the mobile device; determine a specific network slice for servicing the application used on the mobile device; and configure the mobile device to use the application on the specific network slice.

One or more non-transitory computer-readable media including computer-readable instructions, which when executed by one or more processors of a wireless communication core network, cause the wireless communication core network to establish a Protocol Data Unit (PDU) session for a mobile device on a default network slice; determine an application to be used on the mobile device; determine a specific network slice for servicing the application used on the mobile device; and configure the mobile device to use the application on the specific network slice.

Example Embodiments

As noted above, network registration procedures defined in the 3rd Generation Partnership Program (3GPP) standards for cellular communications often introduce redundancies in terms of signaling and payload, that should be addressed.

During network registration procedure, when a connected end device (may be referred to as a User equipment (UE)) requests slices from the core network. After UE has completed the primary authentication, network initiates slice authorization for every slice that UE has requested.

This slice authentication procedure comes at a cost. More specifically, after slice authorization is successfully completed, for that duration of registration, the UE is statically bound to those slices. However, the UE may not use all the slices that the UE requested and may desire use of some other slice depending upon application/service that the UE may not have requested in the initial registration but now intends to use. In another scenario, the UE may never utilize one or more of the original network slices that the UE requested. Therefore, such slice authorization would be rendered useless resulting in wasteful signaling.

In view of the above, the present disclosure provides techniques and procedures that enable network slice authorization when UE intends to use the slice for application(s)/service(s) that the UE intends to use at any given point in time. Doing so would also eliminate the need for having to store a User Route Selection Policy (URSP), which is a large list, on the UE for a network slice until the network slice is actually used by the UE. Furthermore, each network slice has limited capacity and with Network Slice Admission Control Function (NSACF) introduction, some UEs may not get the slice services because some other UE has already registered the slice even thought the other UE may never utilize the slice.

Overall, techniques and procedures disclosed herein will result in optimized network slice utilization and reduces wasteful network resource utilization and signaling.

FIG. 1A illustrates an example cloud computing architecture according to some aspects of the present disclosure. FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102.

The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an Internet-of-things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
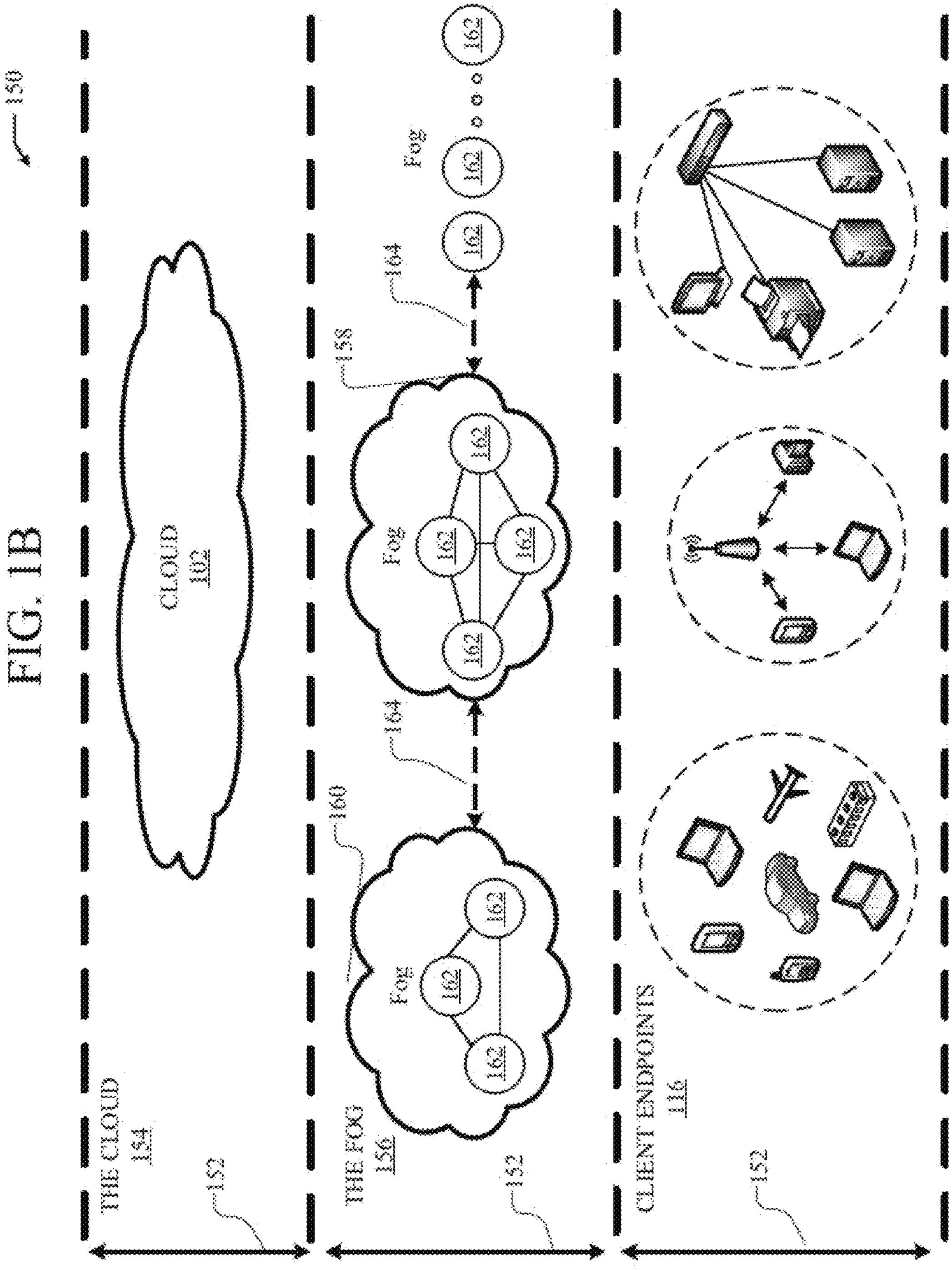
FIG. 1B illustrates an example fog computing architecture according to some aspects of the present disclosure.

FIG. 1B illustrates an example fog computing architecture according to some aspects of the present disclosure. FIG. 1B illustrates a diagram of an example fog computing architecture 150. The fog computing architecture 150 can be incorporated into the cloud computing architecture as described in FIG. 1A. Accordingly, the fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116, as a part of a TCP connection, accessed through the TCP connection, can include an initiator or a receiver of a TCP connection and be utilized by the initiator or the receiver to transmit and/or receive data through the TCP connection.

The fog layer 156 or "the fog" provides the computation, storage, and networking capabilities of traditional cloud networks, but closer to the endpoints. The fog can thus extend the cloud 102 to be closer to the client endpoints 116, and provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc, and be deployed within fog instances 158, 160. For example, the fog instances 156, 158 can be a regional cloud or data center, a local area network, a network of fog nodes 162, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc. Moreover, one or more of the fog nodes 162 can be interconnected with each other via links 164 in various topologies, including star, ring, mesh, or hierarchical arrangements, for example.

In some cases, one or more fog nodes 162 can be mobile fog nodes. The mobile fog nodes can move to different geographic locations, logical locations, or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location.

Figure 2A:
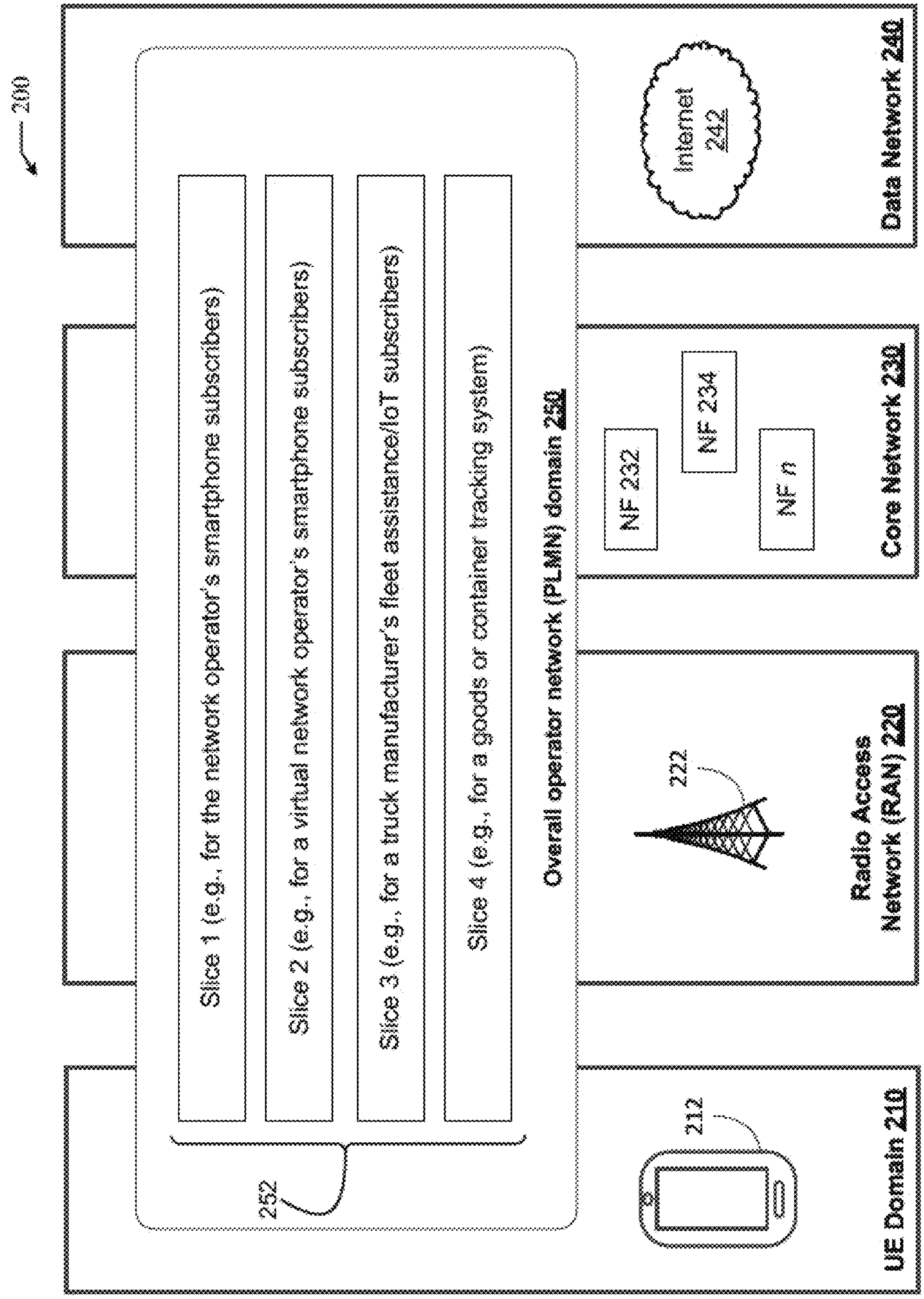
FIG. 2A depicts an example schematic representation of a 5G network environment in which network slicing has been implemented according to some aspects of the present disclosure.

FIG. 2A depicts an example schematic representation of a 5G network environment in which network slicing has been implemented according to some aspects of the present disclosure. FIG. 2A depicts an exemplary schematic representation of a 5G network environment in which network slicing has been implemented, and in which one or more aspects of the present disclosure may operate, according to some aspects of the present disclosure. In some examples, the 5G network environment 200 can be utilized to implement the cloud 102 of FIG. 1A and/or the fog computing architecture 150 of FIG. 1B.

As illustrated, network environment 200 is divided into four domains, each of which will be explained in greater depth below; a User Equipment (UE) domain 210, e.g. of one or more enterprises, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

In some example embodiments, core network 230 is a 5G core network (5GC) in accordance with one or more accepted 5GC architectures or designs, or an Evolved Packet Core (EPC) network, which combines aspects of the 5GC with existing 4G networks. Core Network 230 contains a plurality of Network Functions (NFs), shown here as NF 232, NF 234 . . . . NF n, that executes in a control plane of core network 230. The NFs are configured to provide a service-based architecture in which a given NF allows any other authorized NFs to access its services across any of the network slices 252 or as a unique instance. The plurality of NFs of the core network 230 includes one or more of Access and Mobility Management Functions (AMF) (typically used when core network 230 is a 5GC network); Mobility Management Entities (MME) (typically used when core network 230 is an EPC network); User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs).

In some example embodiments, an AMF/MME can be common to or otherwise shared by multiple slices of the plurality of network slices 252, and in some example embodiments an AMF/MME can be unique to a single one of the plurality of network slices 252. In some examples, the NFs can include a Session Management Function (SMF) that controls session establishment, modification, release, etc., and in the course of doing so, provides other NFs with access to these constituent SMF services.

Various other NFs can be provided without departing from the scope of the present disclosure, as would be appreciated by one of ordinary skill in the art.

Across the four domains of the 5G network environment 200, an overall operator network domain 250 is defined. The operator network domain 250 is in some example embodiments a Public Land Mobile Network (PLMN), a private 5G network and/or a 5G enterprise network, and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

Within the scope of the 5G mobile and wireless network architecture, a network slice comprises a set of defined features and functionalities that together form a complete Public Land Mobile Network (PLMN), a private 5G network and/or a 5G enterprise network for providing services to UEs. This network slicing permits for the controlled composition of the 5G network with the specific network functions and provided services that are required for a specific usage scenario. In other words, network slicing enables a 5G network operator to deploy multiple, independent 5G networks where each is customized by instantiating only those features, capabilities and services required to satisfy a given subset of the UEs or a related business customer needs.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises, to facilitate efficient management of SaaS provisioning to the enterprises.

Figure 2B:
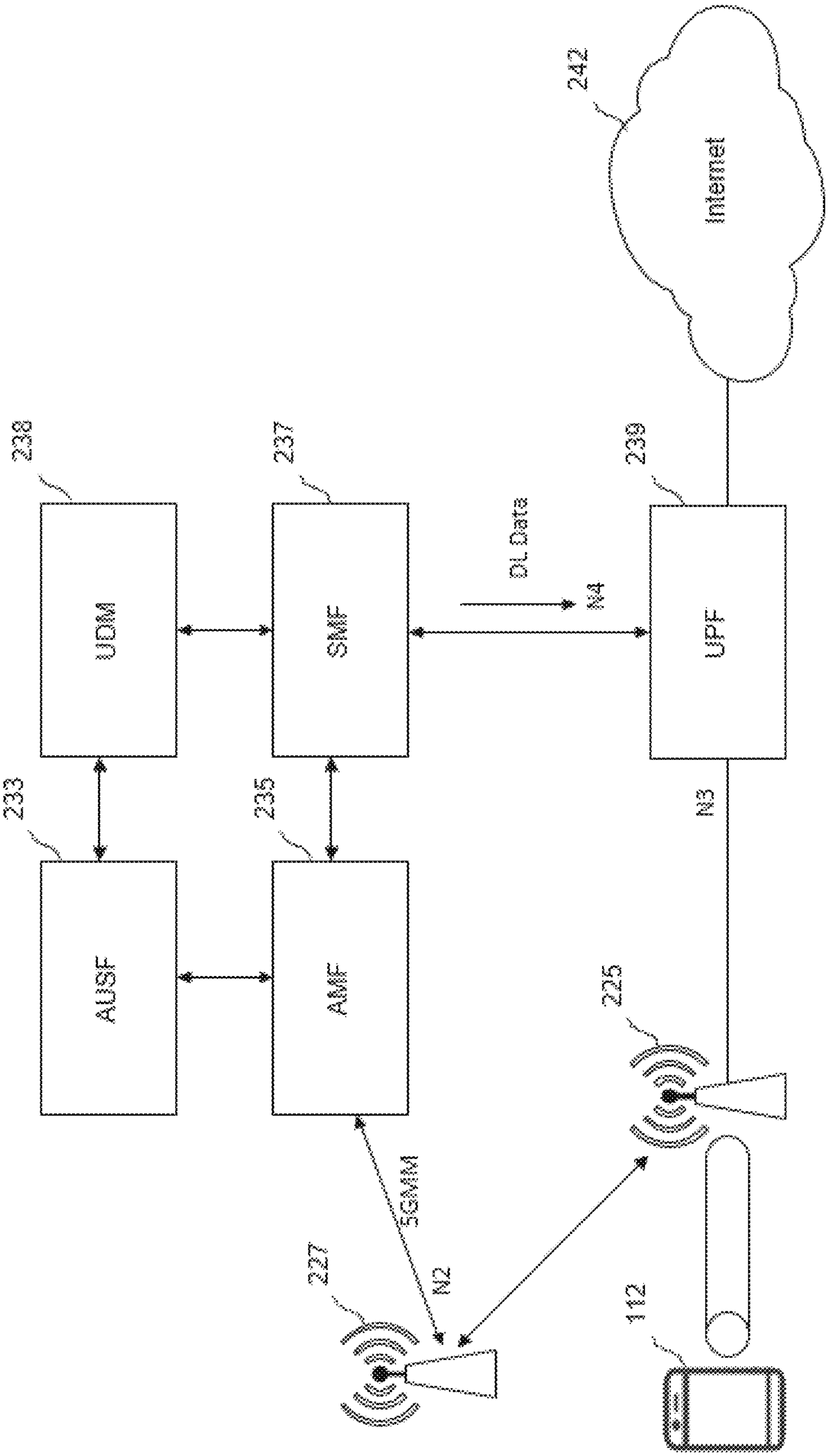
FIG. 2B illustrates an example 5G network architecture according to some aspects of the present disclosure.

FIG. 2B illustrates an example 5G network architecture according to some aspects of the present disclosure. FIG. 2B illustrates an example 5G network architecture. As addressed above, a User Equipment (UE) 212 can connect to a radio access network provided by a first gNodeB (gNB) 225 or a second gNB 227.

The gNB 225 can communicate over a control plane N2 interface with an access mobility function (AMF) 235. AMF 235 can handle tasks related to network access through communication with a unified data management (UDM) function 238. Collectively AMF 235 and UDM 238 can determine whether a UE should have access and if any parameters related to the access should be applied. Accordingly, the AMF 235 utilizes the UDM 238 to retrieve any access based information or restrictions of the UE 212. AMF 235 also works with AUSF 233 to handle authentication and re-authentication of the UE 212 as it moves between access networks. The AUSF and the AMF could be separated or co-located.

Assuming AMF 235 determines the UE 212 should have access to a user plane to provide voice or data communications, AMF 235 can select one or more service management functions (SMF) 237. SMF 237 can configure and control one or more user plane functions (UPF) 239. AUSF 233 can provide a security key to SMF 237 for use in encrypting control plane communications between the SMF 237 and the gNB 225 (or 227), via the UPF. For example, the SMF 237 can configure UPF 239, acting as a router, with traffic classification rules and traffic policies for the IP address.

As noted above SMF 237 can configure and control one or more user plane functions (UPF) 239. SMF 237 communicates with UPF 239 over an N4 Interface which is a bridge between the control plane and the user plane. SMF 237 can send PDU session management and traffic steering and policy rules to UPF 239 over the N4 interface. UPF 239 can send PDU usage and event reporting to SMF 237 over the N4 interface, and also communicate user plane data or voice over the N3 interface back to UE 212 through gNB 225.

Figure 3:
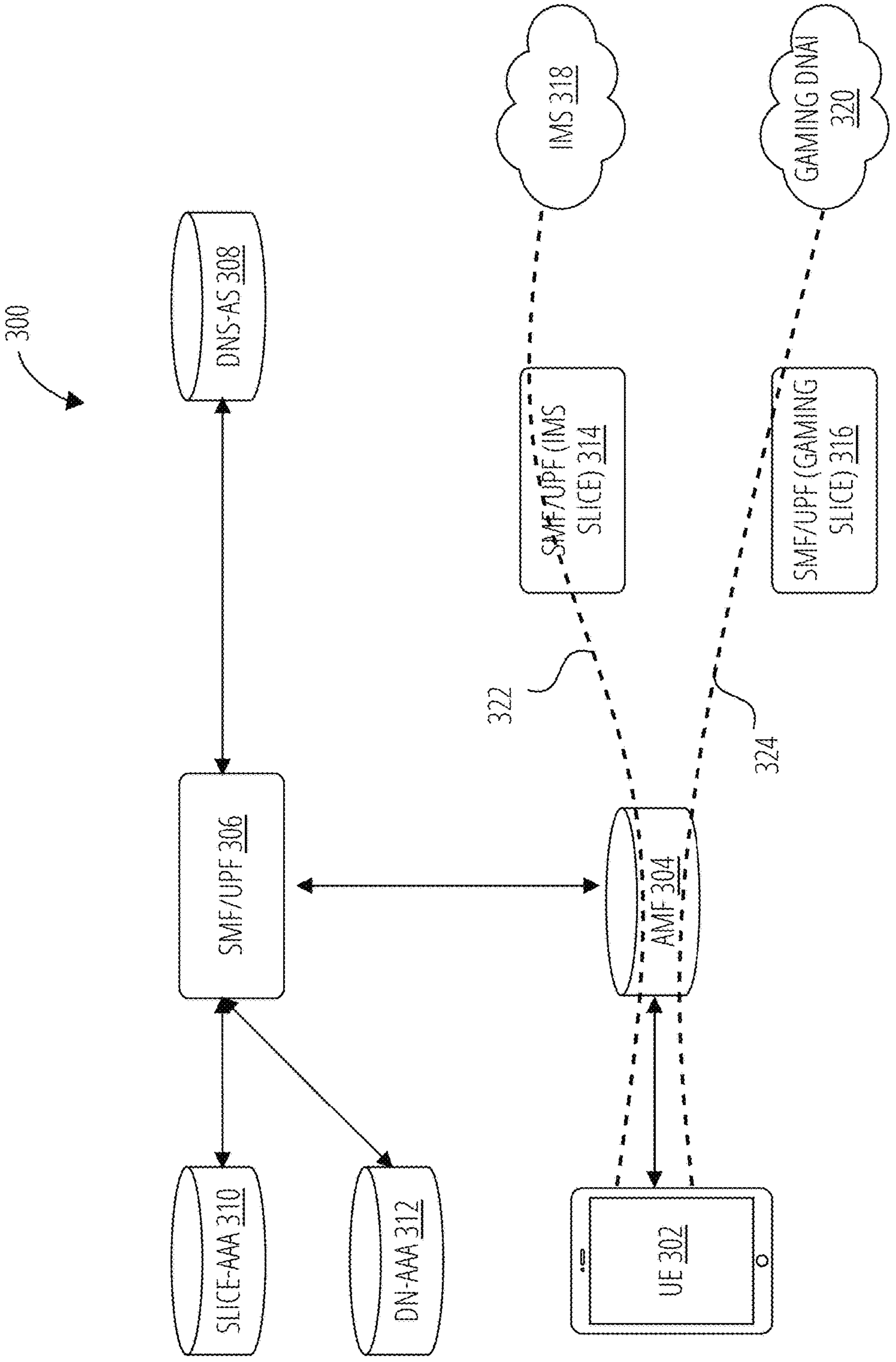
FIG. 3 provides a visual representation of a non-limiting example of network slice registration and utilization techniques according to some aspects of the present disclosure.

FIG. 3—FIG. 3 illustrates examples of various deployment methods to provide details of a local network, such a private network hosting a localized service, to a UE. In these examples, the UE may subscribe to an event to obtain access to an event that is hosted by the private network, where the private network is discovered based on the event registration.

Hereinafter, example embodiments for network slice registration and utilization of the present disclosure will be described, which can be implemented in example network environments of FIGS. 1A-B and 2A-B. Example embodiments will be described in the context of 5th generation cellular networks. However, the present disclosure is not limited thereto and can be applied in any other know or to be developed type of wireless network such as 4G/LTE, 6G/7G and/or any other type of network that utilizes network slicing for servicing application use in connected end devices.

The techniques proposed herein are premised on the following principles: (1) in a typical network deployment, specialized network slices are created to serve specific application(s)/service(s). In other words, network slices are application/service-specification. Such specialized network slices would not be performing any administrative functions such as authentication, Domain Name System (DNS) resolution, etc.; (2) a UE does not need to remember which slice(s), the UE needs to get authorized with while registering; (3) a network also does not need to configure URSP on a UE based on predictions of which applications/services the UE may use; (4) a network has a default slice and Data Network Name (DNN). All UEs that register to the network are allowed to have a default PDU session on the default slice (parent PDU); (5) When an application/service is started, a query would be sent on default PDU session to DNS-Authoritative Source (AS) DNS-AS. Based on DNS-AS's response, the network can identify/determine the correct slice, URSP rules, DNN and Quality of Service (QOS) policies for the application/service; (6) the slice authentication and DNN secondary authentication would be performed over the default slice/PDU session. The specialized network slice would then provide the underlying service for which the specialized network slice has been created (gaming, voice call, etc.).

FIG. 3 provides a visual representation of a non-limiting example of network slice registration and utilization techniques according to some aspects of the present disclosure. In this non-limiting example, as will be described below, a UE registers with a 5G core network on a default network slice (established a default PDU session, which may be referred to as a parent PDU session). Thereafter, the UE may start one or more applications for use such as an Instant Messaging Service (IMS) and a video gaming service. Application(s) and service(s) contemplated within this disclosure are not limited to IMS and video gaming and can include any other known or to be developed application and/or service.

As shown in setting 300 of FIG. 3, the following steps may take place:

(1) UE 302 may initiate an attachment procedure and register with a default network slice thus establishing a default PDU session. In doing so, UE 302 may send UE's Subscriber Permanent Identifier (SUPI) to AMF 304.

(2) Upon receiving UE 203's SUPI, AMF 304 may communicate with SMF/UPF 306 to register UE 302 on a default network slice, hence creating a default PDU session for UE 302. This registration may be performed according to any known or to be developed method.

(3) A voice call application may be initiated on UE 302. For example, the voice call application may be initiated and a user of UE 302 may enter their user ID for using the voice call application (e.g., john@ims.com).

(4) A DNS query and resolution for the user ID (e.g., john) for the voice application (e.g., ims) may be completed, according to any known or to be developed DNS query and resolution method. For instance, the DNS query may be sent to DNS-AS 308 via AMF 304 and SMF/UPF 306.

(5) As part of the DNS response, information including, but not limited to, identification of the IMS slice for the IMS application used on UE 302, associated DNN (e.g., ims.com), QoS details, URSP policies, Authentication, Authorization, and Accounting (AAA), Generic Network Slice Template (GST) are identified and sent from DNS-AS 308 to SMF/UPF 306.

(6) Access Point Name (APN) authentication for UE 302 may be performed on the default slice by SMF/UPF 306 using Data Network (DN)-AAA (DN-AAA 312).

(7) Using the GST included in the DNS response, SMF/UPF 306 may identify the correct application specific slice (e.g., IMS-slice) for UE 302 to connect to.

(8) SMF/UPF 306 performs slice authorization for UE 302 to connect to IMS slice on the default PDU session using Slice-AAA 310 database.

(9) SMF/UPF 306 configures slice-specific URSP (received as part of DNS response) on UE 302.

(10) using the slice-specific URSP, UE 302 establishes a child PDU session on IMS-specific slice (SMF/UPF (IMS Slice) 314) for accessing IMS 318 and using the voice call application using communication 322.

In another example, steps (3)-(10) may similarly be repeated for another application (e.g., gaming application) in order for UE 302 to establish a child PDU session (gaming application-specific PDU session) on gaming-specific slice (SMF/UPF (Gaming Slice) 316) to connect to GAMING DNAI 320 using communication 324.

In another example, whenever the use of a specific application (e.g., IMS service and/or gaming application) is terminated on UE 302, corresponding child PDU session on the respective specific slice (e.g., SMF/UPF (IMS Slice) 314 and/or SMF/UPF (Gaming Slice) 316) may be terminated.

While in the example above, a given application-specific network slice is described as being associated with a single application or service, the present disclosure is not limited thereto. A network slice may be specific to more than one application and/or service.

By performing the steps described above, use of application specific network slices can be optimized such that (UE registration and authentication processes are moved to a default network slice and application/service-specific network slices are only used for a duration of a respective application or service on a connected UE.

Figure 4:
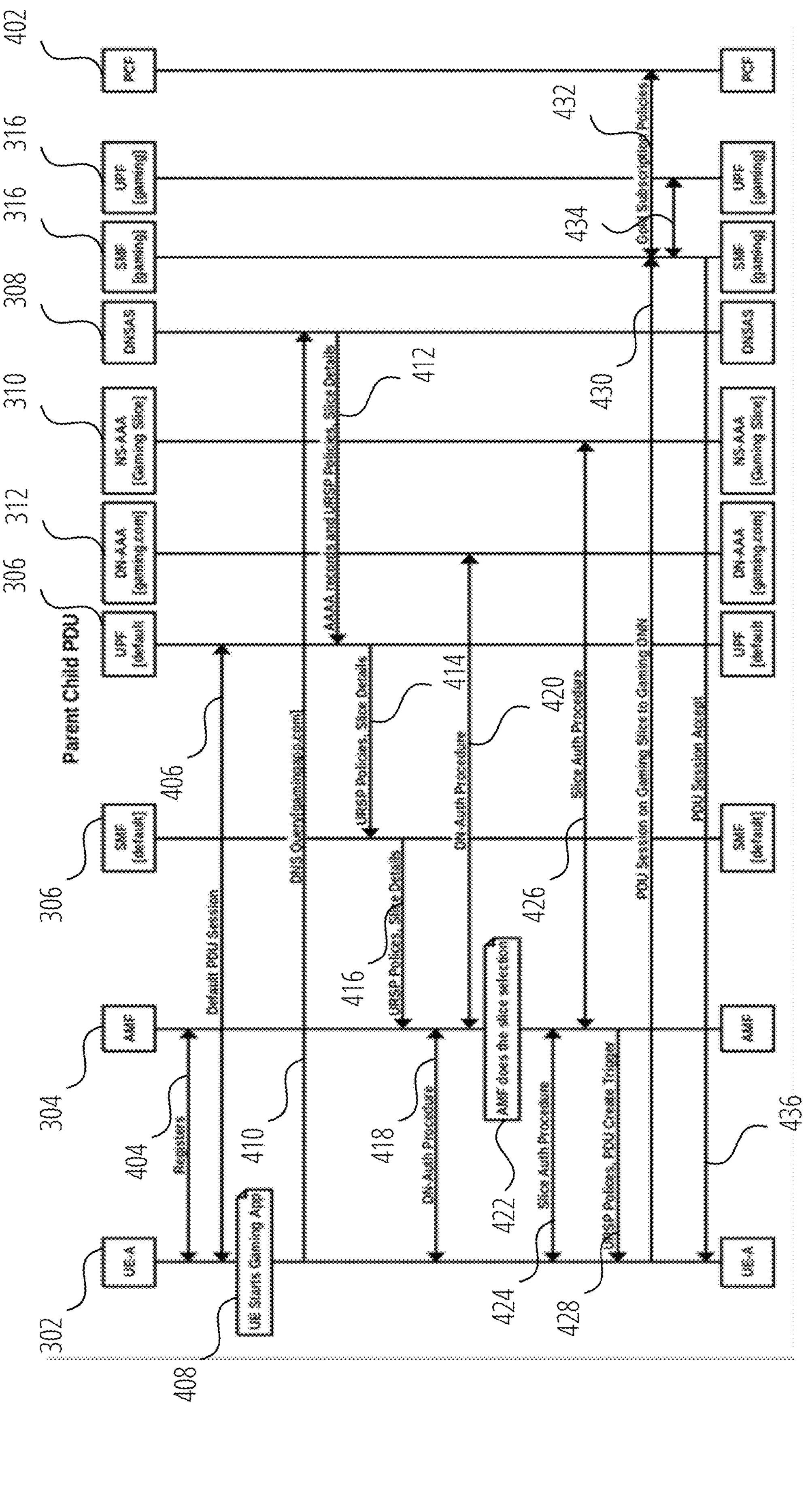
FIG. 4 illustrates an example messaging between network components to implement network slice registration and utilization techniques according to some aspects of the present disclosure.

Example signaling for enabling example steps (1)-(10) above are described for the non-limiting example of the gaming application, with respect to FIG. 4.

FIG. 4 illustrates an example messaging between network components to implement network slice registration and utilization techniques according to some aspects of the present disclosure.

In addition to UE 302 and 5G core network elements of FIG. 3 (which are numbered the same in FIG. 4), FIG. 4 shows an additional 5G core functionality, PCF 402, that may be involved in one of the signaling messages, as will be described below.

Similar to steps (1) and (2) described above with reference to FIG. 3, UE 302 registers with 5G core and established a parent PDU session (default PDU session) on a default network slice using signaling messages 404 and 406 between UE 302 and AMF 304 and SMF/UPF 306, respectively.

At 408, a gaming application is initiated on UE 302. This may be the same as step (3) described with reference to FIG. 3.

A DNS query and resolution for the gaming application may be performed using signaling 410 from UE 302 to DN-AAA 312. This may be the same as step (4) described with reference to FIG. 3.

A DNS response including gaming-specific slice details, GTS requirement, DN for the gaming application, AAA records, etc., may be received as part of the DNS response using signaling 412 from DNS-AS 308 to SMF/UPF 306.

URSP policies and gaming slice information are exchanged between UPF and SMF of SMF/UPF 306 using signaling 414, which in turn are sent from SMF/UPF 306 to AMF 304 using signaling 416.

DN authentication procedure for UE 302 are performed by AMF 304 and relevant exchanges are made using signaling message 418 and subsequently signaling message 420 between DN-AAA 312 and AMF 304.

Once the DN authentication procedure is completed, at 422, AMF 304 performs a slice selection (e.g., based on GTS requirements, as described above with reference to FIG. 3).

Using signaling messages 424 and 426, slice authorization procedure may be completed between UE 302, AMF 304, and Slice-AAA 310.

Once the slice authorization for the gaming application-specific network slice is completed, URSP policies, and PDU create triggers may be sent to UE 302 by AMF 304 using signaling message 428.

Thereafter, application-specific PDU (child PDU) session is established between UE 302 and SMF/UPF (Gaming Slice) 316 using signaling 430. In one example, subscription policies for the gaming application may be exchanged between SMF/UPF (Gaming Slice) 316 and PCF 402 using signaling 432 and signaling 434 between SMF and UPF of SMF/UPF (IMS SMF/UPF (Gaming Slice) 316.

A child PDU session accept may then be exchanged between SMF/UPF (Gaming Slice) 316 and UE 302 using signaling 436.

Figure 5:
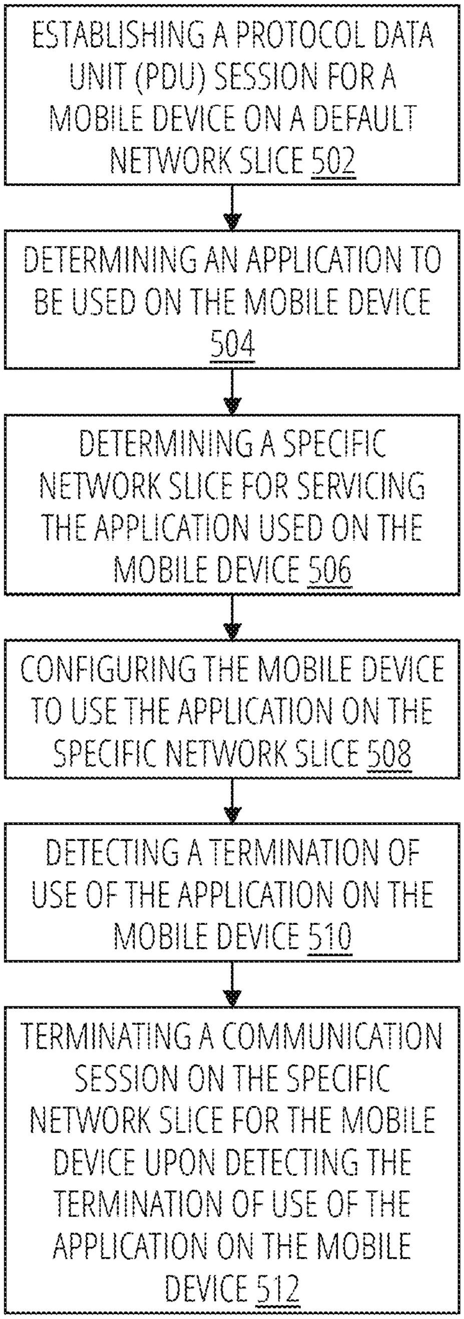
FIG. 5 is a flowchart of an example process for network slice registration and utilization according to some aspects of the present disclosure.

FIG. 5 is a flowchart of an example process for network slice registration and utilization according to some aspects of the present disclosure. The example process of FIG. 5 may be performed by one or more processors executing computer-readable instructions stored on one or more memories to implement various functions of a core network of wireless communication network such as a 5G core network (e.g., AMF 304, SMF/UPF 306, etc.). In describing FIG. 5, references may be made to any one of FIGS. 1A-B, 2A-B, 3, and 4.

FIG. 5 is a flowchart of an example process for network slice registration and utilization according to some aspects of the present disclosure. The example process of FIG. 5 may be performed by one or more processors executing computer-readable instructions stored on one or more memories to implement various functions of a core network of wireless communication network such as a 5G core network (e.g., AMF 304, SMF/UPF 306, etc.). In describing FIG. 5, references may be made to any one of FIGS. 1A-B, 2A-B, 3, and 4.

At block 502, a Protocol Data Unit (PDU) session for a mobile device (e.g., UE 302) on a default network slice may be established. This may be the parent PDU session described above. This process may be performed as described above with reference to steps (1) and (2) in FIG. 3 and associated signaling messages described with reference to FIG. 4.

At block 504, a determination may be made that an application is to be used on the mobile device. This process may be performed according to steps (3)-(6) of FIG. 3 and associated signaling messages described with reference to FIG. 4. In one example, determining the application to be used on the mobile device includes receiving Generic Slice Templates (GST) requirements for the specific network slice from the mobile device, and determining the specific network slice based on the GST requirements. In one example, the GST requirements are received as part of Domain Name Service (DNS) resolution on the default network slice. In another example and as described above with reference to FIGS. 3 and 4, User Route Selection Policy (URSP) may be received as part of the DNS resolution on the default network slice.

At block 506, a specific network slice (application/service-specific network slice) for servicing the application used on the mobile device may determined. Non-limiting examines of a specific network slice include an IMS-specific network slice (SMF/UPF (IMS Slice) 314, a video gaming-specific network slice (SMF/UPF (Gaming Slice) 316), etc. This process may be performed according to steps (7) and (8) of FIG. 3 and associated signaling messages described with reference to FIG. 4.

At block 508, the mobile device may be configured to use the application on the specific network slice. This process may be performed, for example, according to steps (9) and (10) of FIG. 3 and associated signaling messages described with reference to FIG. 4. In one example, configured the mobile device includes performing slice authorization for the specific network slice on the default network slice, configuring User Route Selection Policy (URSP) for using the specific network slice application, on the mobile device, and establishing a new PDU session (application/service-specific PDU session also identified as a child PDU session above) for the mobile device on the specific network slice using the URSP.

In one example, the PDU session over the default network slice (parent PDU session) and a new PDU session on the specific network slice (a child PDU session such as IMS-specific PDU session and/or gaming-specific PDU session described with reference to FIG. 3) may be established with a UPF of a 5G core network.

At block 510, a termination of use of the application on the mobile device, may be determined. This may be performed according to any known or to be used method.

At block 512, a communication session on the specific network slice for the mobile device upon detecting the termination of use of the application on the mobile device may be terminated.

Figure 6:
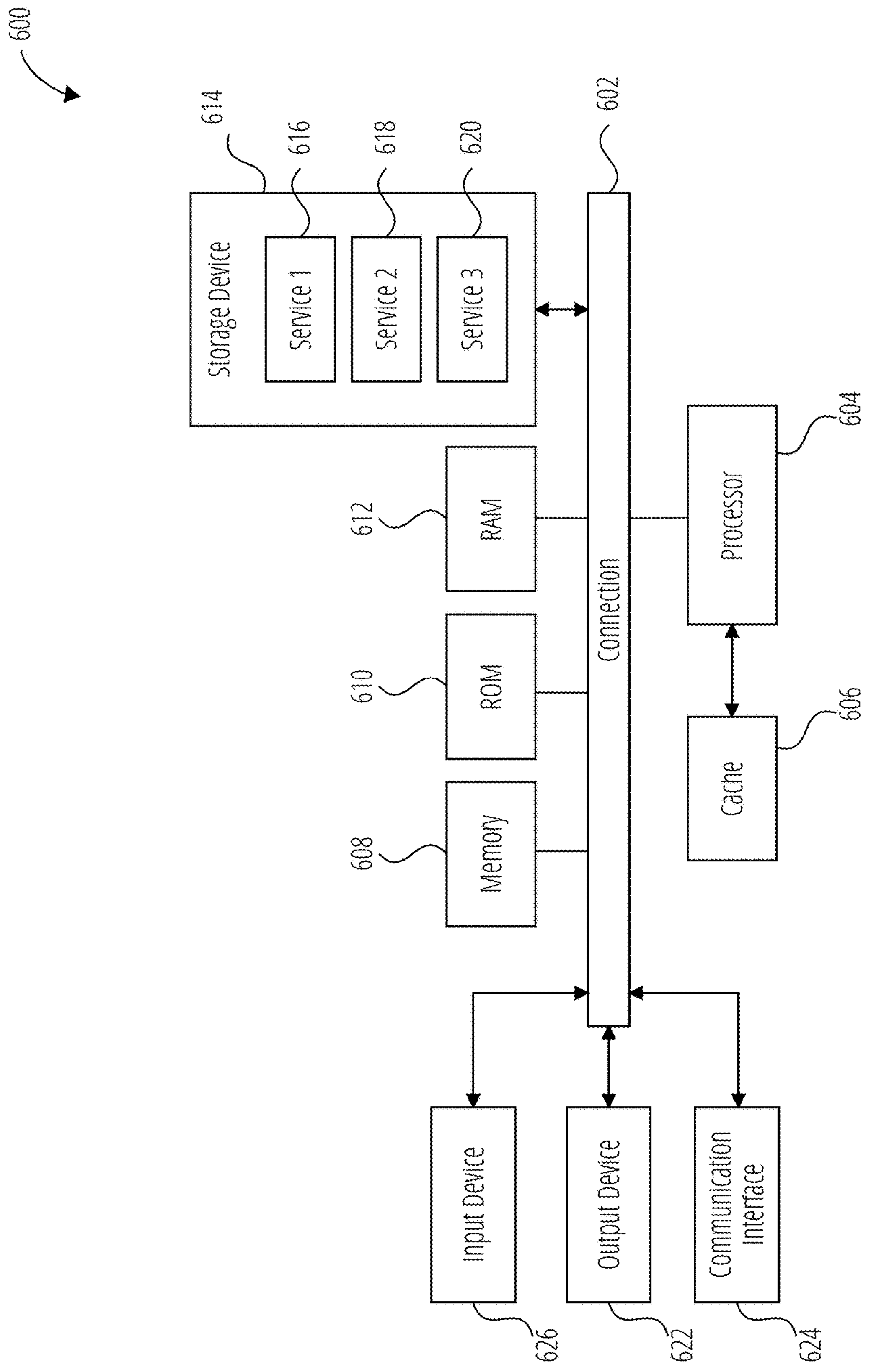
FIG. 6 shows an example computing system which can be, for example any computing device that can implement components of the system according to some aspects of the present disclosure.

FIG. 6 shows an example computing system which can be, for example any computing device that can implement components of the system according to some aspects of the present disclosure. FIG. 6 shows an example of computing system 600, which can be for example UE 302 or any computing device making up one or more processors performing functionalities of 5G core network such as AMF 304, SMF/UPF 306, and/or any other component of 5G core network or enterprise network as described with reference to FIGS. 1A-B, 2A-B, etc. Computing system 600 or any component thereof may be in communication using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory. USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The invention claimed is:

1. A method comprising:

establishing a Protocol Data Unit (PDU) session for a mobile device on a default network slice;

determining an application to be used on the mobile device, based at least in part on DNS resolution performed on the default network slice;

receiving, as part of the DNS resolution performed on the default network slice, Generic Slice Template (GST) requirements for a specific network slice for servicing the application;

determining a specific network slice for servicing the application used on the mobile device based at least in part on the GST requirements;

performing, on the default network slice and before establishment of a PDU session for the mobile device on the specific network slice, slice authorization for the mobile device to use the specific network slice, wherein the slice authorization performed on the default network slice includes transmitting an authorization request to a slice authorization function and receiving an authorization response authorizing the mobile device to operate on the specific network slice; and configuring the mobile device to use the application on the specific network slice, wherein configuring the mobile device includes configuring User Route Selection Policy (URSP) for using the application on the specific network slice and establishing a child PDU session for the mobile device on the specific network slice using the URSP.

2. The method of claim 1, further comprising:

detecting a termination of use of the application on the mobile device; and terminating a communication session on the specific network slice for the mobile device upon detecting the termination of use of the application on the mobile device.

3. The method of claim 1, wherein the PDU session over the default network slice and a new PDU session on the specific network slice are established with a UPF of a 5G core network.

4. An apparatus comprising:

one or more memories having computer-readable instructions stored therein; and one or more processors configured to execute the computer-readable instructions to:

establish a Protocol Data Unit (PDU) session for a mobile device on a default network slice;

determine an application to be used on the mobile device, based at least in part on DNS resolution performed on the default network slice;

receive, as part of the DNS resolution performed on the default network slice, Generic Slice Template (GST) requirements for a specific network slice for servicing the application;

determine a specific network slice for servicing the application used on the mobile device based at least in part on the GST requirements;

perform, on the default network slice and before establishment of a PDU session for the mobile device on the specific network slice, slice authorization for the mobile device to use the specific network slice, wherein the slice authorization performed on the default network slice includes transmitting an authorization request to a slice authorization function and receiving an authorization response authorizing the mobile device to operate on the specific network slice; and configure the mobile device to use the application on the specific network slice, wherein configuring the mobile device includes configuring User Route Selection Policy (URSP) for using the application on the specific network slice and establishing a child PDU session for the mobile device on the specific network slice using the URSP.

5. The apparatus of claim 4, wherein the one or more processors are further configured to execute the computer-readable instructions to:

detecting a termination of use of the application on the mobile device; and terminating a communication session on the specific network slice for the mobile device upon detecting the termination of use of the application on the mobile device.

6. The apparatus of claim 4, wherein the PDU session over the default network slice and a new PDU session on the specific network slice are established with a User Plane Function (UPF) of a 5G core network.

7. One or more non-transitory computer-readable media comprising computer-readable instructions, which when executed by one or more processors of a wireless communication core network, cause the wireless communication core network to:

establish a Protocol Data Unit (PDU) session for a mobile device on a default network slice;

determine an application to be used on the mobile device, based at least in part on DNS resolution performed on the default network slice;

receive, as part of the DNS resolution performed on the default network slice, Generic Slice Template (GST) requirements for a specific network slice for servicing the application;

determine a specific network slice for servicing the application used on the mobile device based at least in part on the GST requirements;

perform, on the default network slice and before establishment of a PDU session for the mobile device on the specific network slice, slice authorization for the mobile device to use the specific network slice, wherein the slice authorization performed on the default network slice includes transmitting an authorization request to a slice authorization function and receiving an authorization response authorizing the mobile device to operate on the specific network slice; and configure the mobile device to use the application on the specific network slice, wherein configuring the mobile device includes configuring User Route Selection Policy (URSP) for using the application on the specific network slice and establishing a child PDU session for the mobile device on the specific network slice using the URSP.

8. The one or more non-transitory computer-readable media of claim 7, wherein the execution of the computer-readable instructions further cause the wireless communication core network to:

detecting a termination of use of the application on the mobile device; and terminating a communication session on the specific network slice for the mobile device upon detecting the termination of use of the application on the mobile device.

9. The method of claim 1, wherein the DNS resolution includes receiving, from a DNS authorization server, one or more of a DNN associated with the application, AAA information associated with the application, and the GST requirements.

10. The method of claim 1, wherein the authorization request is transmitted to a Slice-AAA function using one or more signaling messages while a parent PDU session remains active on the default network slice.

11. The method of claim 1, wherein the specific network slice comprises an IMS-specific network slice or a gaming-specific network slice.

12. The method of claim 1, wherein the child PDU session is established with an SMF/UPF corresponding to the specific network slice.

13. The apparatus of claim 4, wherein the DNS resolution includes receiving, from a DNS authorization server, one or more of a DNN associated with the application, AAA information associated with the application, and the GST requirements.

14. The apparatus of claim 4, wherein the authorization request is transmitted to a Slice-AAA function using one or more signaling messages while a parent PDU session remains active on the default network slice.

15. The apparatus of claim 4, wherein the specific network slice comprises an IMS-specific network slice or a gaming-specific network slice.

16. The apparatus of claim 4, wherein the child PDU session is established with an SMF/UPF corresponding to the specific network slice.

17. The one or more non-transitory computer-readable media of claim 7, wherein the DNS resolution includes receiving, from a DNS authorization server, one or more of a DNN associated with the application, AAA information associated with the application, and the GST requirements.

18. The one or more non-transitory computer-readable media of claim 7, wherein the authorization request is transmitted to a Slice-AAA function using one or more signaling messages while a parent PDU session remains active on the default network slice.

19. The one or more non-transitory computer-readable media of claim 7, wherein the specific network slice comprises an IMS-specific network slice or a gaming-specific network slice.

20. The one or more non-transitory computer-readable media of claim 7, wherein the child PDU session is established with an SMF/UPF corresponding to the specific network slice.

* * * * *